United States Patent
Laenen et al.

[15] 3,640,653
[45] Feb. 8, 1972

[54] TIRE CURING PRESS

[72] Inventors: Nicholas M. Laenen, Columbiana; James M. Cooper, Tallmadge, both of Ohio

[73] Assignee: NRM Corporation, Akron, Ohio

[22] Filed: June 29, 1970

[21] Appl. No.: 50,833

[52] U.S. Cl. ................................... 425/33, 425/38, 425/45
[51] Int. Cl. .......................................................... B29h 5/02
[58] Field of Search ..................... 18/17 K, 17 W, 2 TP, 2 TD

[56] References Cited

UNITED STATES PATENTS

| | | | |
|---|---|---|---|
| 3,396,221 | 8/1968 | Balle et al. | 18/17 K X |
| 3,471,895 | 10/1969 | Ulm et al. | 18/17 W X |
| 3,487,507 | 1/1970 | Turk | 18/17 K |

*Primary Examiner*—J. Howard Flint, Jr.
*Attorney*—Oberlin, Maky, Donnelly & Renner

[57] ABSTRACT

Upstanding bladder-type tire curing press having a fluid pressure actuated post engaged with the closed upper end of the bladder and having post and bladder pressure controls to facilitate the tire carcass loading, shaping, curing, and unloading operations. The press also has a stationarily mounted stripper with respect to which the cured tire is raised thus to strip the tire from the movable toe ring of the top mold section for discharge onto an unloading conveyor beneath the stripper.

8 Claims, 11 Drawing Figures

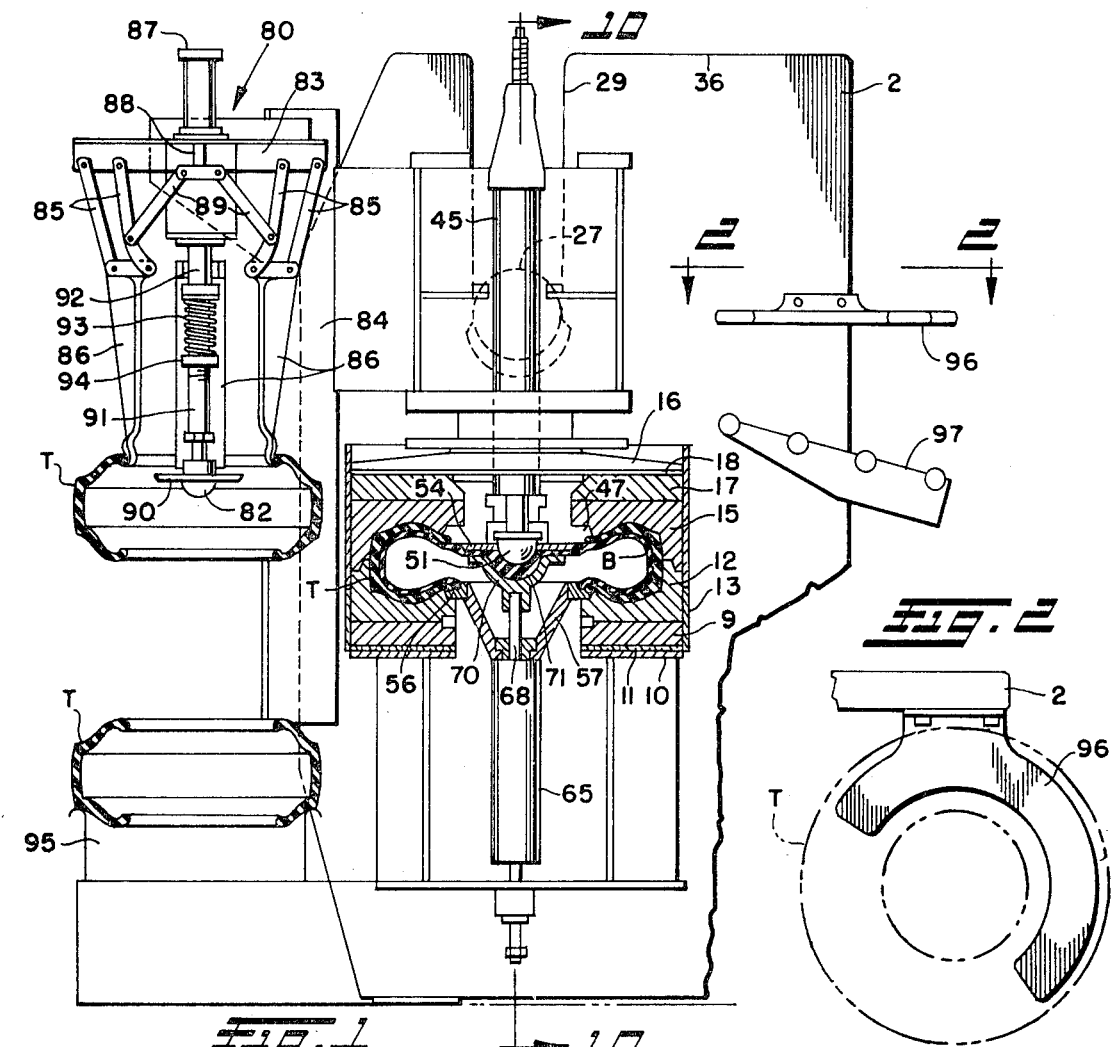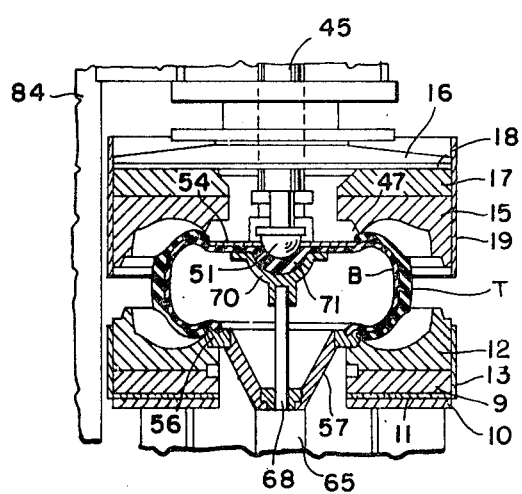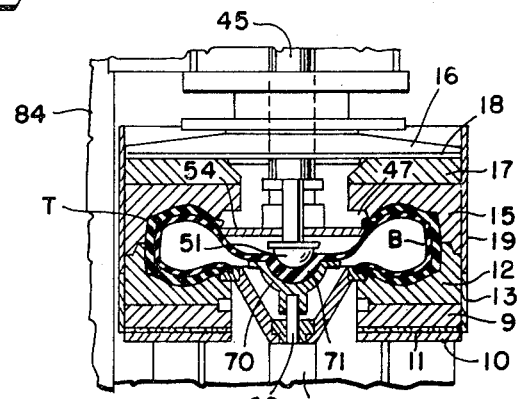

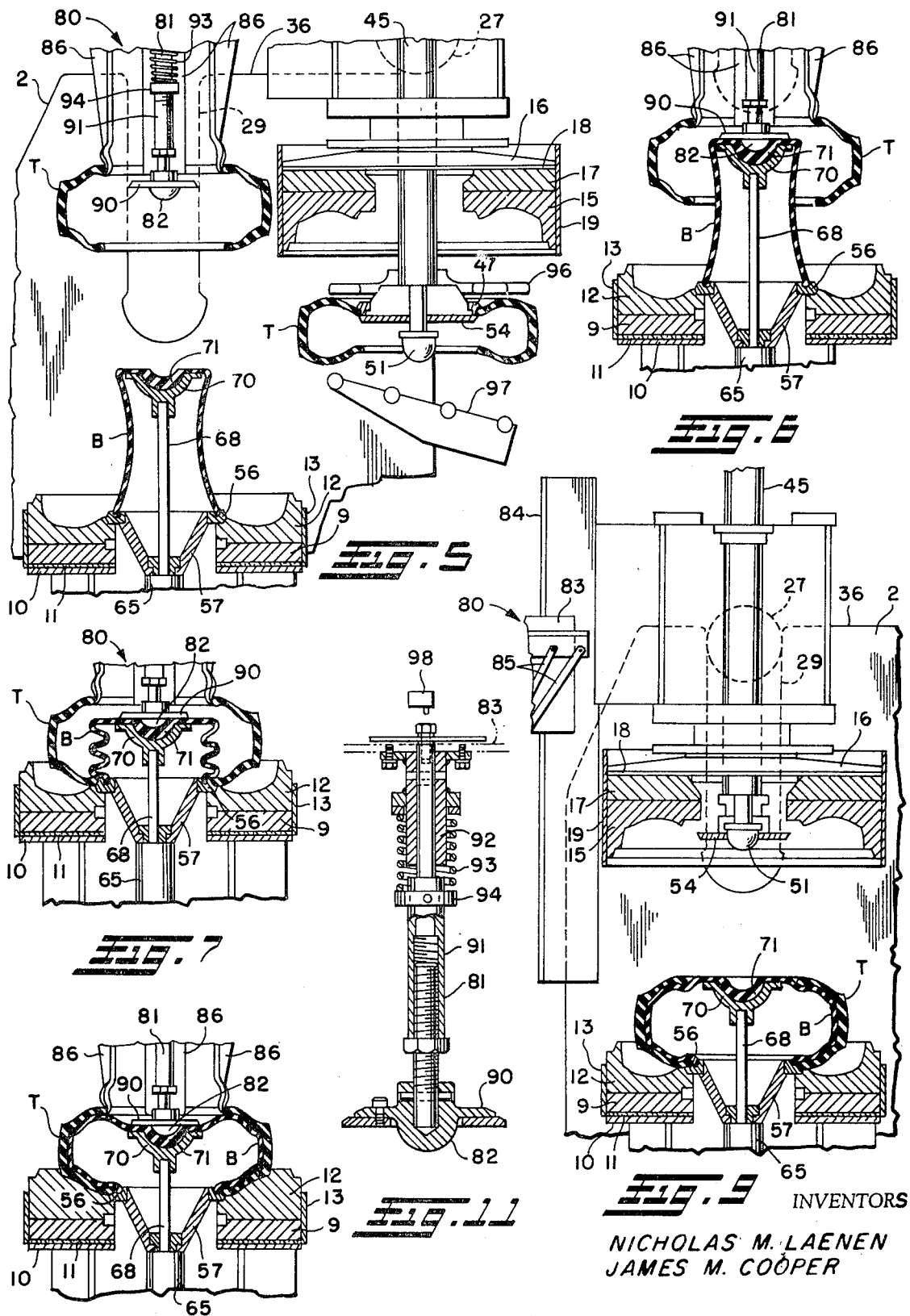

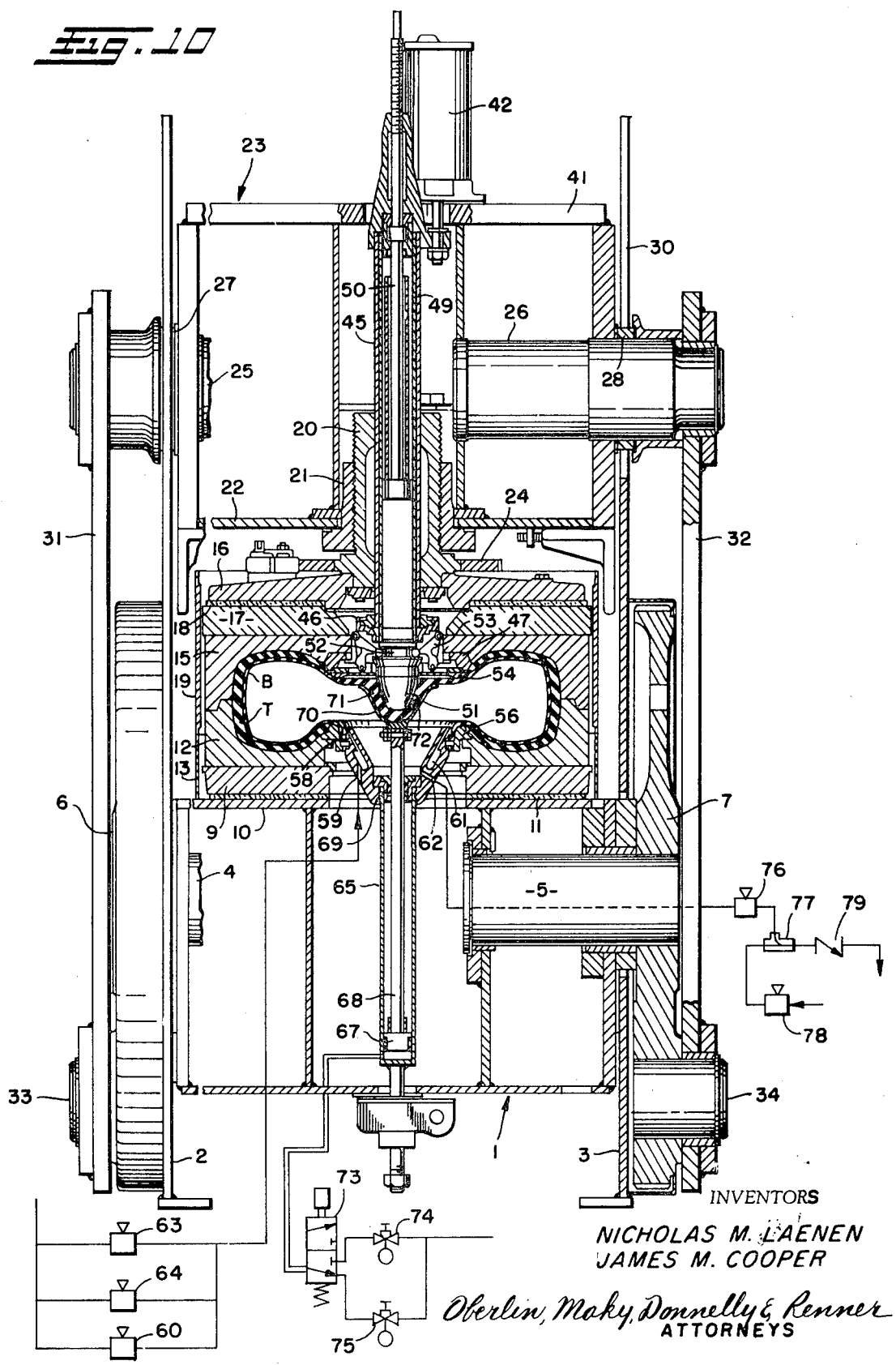

TIRE CURING PRESS

BACKGROUND OF THE INVENTION

It is known as disclosed in the Ulm et al., U.S. Pat. No. 3,471,895, granted Oct. 14, 1969, to provide in a tire curing press an upstanding shaping and curing bladder over which a tire carcass is telescoped for shaping and curing in a tire-shaped mold by introducing curing medium under pressure into the bladder, the bladder having connected to the upper end thereof a post assembly which allows the bladder to be axially shortened and radially expanded for the shaping and curing operation and to be axially lengthened and radially contracted for the carcass loading operation and for the cured tire stripping operation. The Ulm et al., press aforesaid is also provided with a carcass loader which lowers an uncured carcass over the upstanding bladder and which depresses the upper end of the bladder in case the axially distended dimension of the bladder exceeds the bead to bead dimension of the tire carcass as in a radial tire carcass for example; and with a carcass unloader which has chuck members movable radially under the top bead of the cured tire to lift the tire out of the bottom mold section, to strip the tire from the bladder, to strip the tire from the top mold section, and to shift the tire laterally of the bladder for release onto an unloading conveyor after the chuck members are radially withdrawn from beneath the top bead.

SUMMARY OF THE INVENTION

A tire curing press of the upstanding bladder type wherein the upper end of a post assembly is engaged with the upper closed end of the bladder characterized in the provision of a dual pressure control for the post assembly so that when the post assembly is actuated by the higher pressure, the bladder is axially distended and radially contracted so that an uncured tire carcass held by a vertically movable loader may be lowered into telescoped relation around the axially distended bladder. The loader and upper end of the bladder have interfitting plug and socket portions for locating the loader and carcass held thereby coaxially with respect to the bladder and the bottom mold section. When the locating portion of the loader engages the upper end of the bladder it depresses the latter in the event that the axial dimension of the distended bladder exceeds the bead to bead dimension of the uncured carcass, and at this time the post assembly is actuated by the lower one of the dual pressures aforesaid. The locator is spring biased and initiates preinflation for the bladder when it decompresses, thus to radially expand the bladder into the tire carcass to expel air from between the exterior of the bladder and the inside wall of the carcass.

The dual pressure operation of the post assembly is also of significance in the unloading operation in that when the press is opened after the carcass has been cured in the tire-shaped cavity defined between the top and bottom mold sections, high-pressure actuation of the post assembly maintains the upper end of the bladder in contact with the center portion of the top mold section as the latter moves upwardly thus to axially distend the bladder to strip it from within the cured tire which is held in the top mold section by chuck members engaged under the top bead. During this bladder stripping operation, vacuum is applied within the bladder to assist in radial contraction of the bladder out of the interior of the cured tire.

The press herein is further characterized in that the cured tire is stripped or ejected from the top mold section by downward movement of the top toe ring which is engaged within the top bead of the tire and if the tire does not drop from the toe ring when the chuck members are withdrawn radially from beneath the top bead of the tire, the upward return movement of the top toe ring will raise the cured tire into engagement with a stationary member on the press which arrests upward movement of the tire whereby continued upward movement of the toe ring will strip the toe ring from the top bead so that the tire may drop onto an unloading conveyor.

BRIEF DESCRIPTION OF THE DRAWINGS

FIGS. 1 and 3 to 9 illustrate various positions of the press components during loading of an uncured tire carcass into the press when the press is open (FIGS. 5 to 9), during curing of the carcass when the press is closed (FIG. 1), during unloading of the cured tire from the press as the press is opened (FIGS. 3 and 4), and during stripping of the cured tire from the unloader while the next uncured carcass is ready to be loaded (FIG. 5);

FIG. 2 is a cross section view taken substantially along the line 2—2, FIG. 1 illustrating the fixed stripper on the press which strips the cured tire from the unloader when the press is opened as in FIG. 5;

FIG. 10 is a cross section view along line 10—10, FIG. 1 illustrating the details of the unloading chuck and of the bladder and post assembly together with the bladder mounting means which clamps the lower open end of the bladder within the inner periphery of the bottom mold section; and FIG. 11 is a detail cross section view of the spring-biased locator associated with the carcass loader.

DETAILED DESCRIPTION OF THE INVENTION

Referring first to FIG. 10, the press comprises a base 1 between upstanding sideplates 2 and 3 with stub shafts 4 and 5 projecting from opposite ends of the base 1 and through the sideplates 2 and 3 to support bull gear cranks 6 and 7 which are keyed to the projecting ends of the respective stub shafts 4 and 5, the bull gear cranks 6 and 7 being driven in one direction to open the press and in the opposite direction to close the press.

An annular platen 9 is supported on the top plate 10 of the base 1 with a layer of insulation 11 interposed therebetween and the bottom mold section 12 is supported on the platen 9 with a heat shield 13 surrounding said bottom mold section 12 and platen 9.

The annular top mold section 15 is supported from a bolster 16 with a heating platen 17 and a layer of insulation 18 interposed between the bolster 16 and the top mold section 15 and a heat shield 19 extends about the top mold section 15. The bolster 16 is secured to the lower end of a screw 20 which has threaded engagement in a nut 21 fixed to plate 22 of the press head 23 and as evident, rotation of the screw 20 as by the gear 24 vertically adjusts the top mold section 15 with respect to the press head 23 to the stacking height of the top and bottom mold sections 15 and 12, i.e., the closed position of the press (FIGS. 1 and 10) wherein said mold sections 15 and 12 are interengaged to define a tire-shaped cavity therebetween.

The press head 23 has projecting from opposite ends thereof shafts 25 and 26 on which are mounted rollers 27 and 28 respectively riding in slots 29 and 30 formed in the sideplates 2 and 3. Links 31 and 32 are pivotally mounted at their upper and lower ends to shafts 25 and 26 and to the crank pins 33 and 34 projecting from the respective bull gears 6 and 7.

It can be seen that when the bull gears 6 and 7 are rotated in unison in a clockwise direction as viewed from the right-hand side of FIG. 10, the rollers 27 and 28 will move vertically up the slots 29 and 30 in the sideplates 2 and 3 to move the top mold section 15 vertically away from the bottom mold section 12 and continued rotation of the bull gears 6 and 7 in clockwise direction will cause the press head 23 and the top mold section 15 carried thereby to move backwardly along the top edge 36 of the plates 2 and 3 (see FIG. 5 for example). When the rotation of the bull gears 6 and 7 is reversed, the press head 23 moves horizontally forwardly along the top edge 36 of the sideplates 2 and 3 and thence vertically down the slots 29 and 30 to close the press 1.

The press 1 herein is of the dual type wherein the sideplates 2 and 3 are spaced apart to accommodate two sets of molds 15-12 therebetween and by reason of the screw 20 adjustment, the two sets of molds 15-12 may be of the same size or different size as desired.

Mounted on the top plate 41 of the press head 23 is an ejector cylinder 42, the rod of which is secured to a cylinder 45 which at its lower end carries a chuck housing 46 and the toe ring 47 of the top mold section 15. Within the cylinder 45 is a chuck actuating cylinder 49 which is movable vertically with respect to a piston 50 which has screw-threaded adjustable engagement with cylinder 45, the lower end of the chuck actuating cylinder 49 having a rounded bottom end 51 and an adjacent groove 52 for actuating bellcranks 53 which are pivotally mounted in the chuck housing 46 and which, when pivoted outwardly by downward movement of the actuating cylinder 49 serve to move the chuck members 54 radially outwardly to engage under the top bead of the cured tire T. The downward movement of the cylinder 49 with its end 51 engaged in a socket in the upper end of the bladder B serves to push the upper end of the bladder B downwardly to make room for radial outward movement of the chuck members 54. When the chuck actuating cylinder 49 is moved upwardly, the bellcranks 53 are swung in the opposite direction to retract the chuck members 54 from beneath the top bead of the tire T.

The bottom toe ring 56 cooperates with a spray ring 57 to secure the annular bead 58 of the lower open end of the bladder B therebetween, this general construction being described in detail in the aforesaid Ulm et al., U.S. patent. The spray ring 57 is provided with a port 59 to which a valve 60 is connected for supply of curing medium under pressure into the manifold 61 having a series of orifices to direct curing medium to circulate around the interior of the bladder B, and with a drain port 62 from which spent curing medium may be drained. Also connected to the port 59 are preinflate and hold valves 63 and 64.

Dependent downwardly from the spray ring 57 is a cylinder 65 in which the piston 67 is reciprocable, said piston having a rod 68 extending through packing 69 to constitute a post having a socket member 70 at its upper end engaging a corresponding downward protuberance 71 at the center of the closed end of the bladder B which protuberance in turn forms a socket 72 for the lower end 51 of the chuck actuating cylinder 49 as previously explained. The lower end of the cylinder 65 has a solenoid operated valve 73 connected thereto for actuating the post means with high-pressure or low-pressure air from the pressure reducing valve 74 and 75 i.e., about 70 p.s.i. or about 10 p.s.i.

The drain port 62 has connected thereto a main drain valve 76 which, when opened, passes fluid through a vacuum ejector 77, the draining of the bladder B being accelerated by flow of cold water through the valve 78 and ejector 77. The cold water and drained curing medium then flows through the check valve 79 to a drain tank (not shown). As hereinafter explained, the flow of cold water through the ejector 77 also serves to create a partial vacuum in the bladder B to facilitate stripping of the cured tire T from the bladder B.

Having thus described the press construction and the unloading chuck, reference will now be made to the loader 80 as illustrated in FIGS. 1, 5, 9, and 11, the last-mentioned figure illustrating in detail the adjustable spring-biased bladder detector or locator 81 which has a pilot portion 82 adapted to fit in the socket 72 in bladder B to coaxially locate the upper end of the bladder B with respect to the loader 80 and the tire carcass T carried thereby.

The loader 80 comprises a loader carriage 83 which is vertically movably guided on a guide member 84 which is secured on the press head 23. Pivotally mounted on the carriage 83 are four sets of parallelogram linkages 85 having their upper ends pivotally mounted to the carriage 83 and their lower ends pivotally mounted to loader segments 86 which have lower hooked ends adapted to engage the top bead of a carcass T when moved radially outwardly by actuation of the cylinder 87 whose piston rod 88 is connected to the respective parallelogram linkages 85 by connecting links 89.

Referring especially to FIG. 11, the bladder detector or locator 81 has a plate portion 90 which is adapted to engage the upper end of the bladder B surrounding the socket portion 72 and this plate portion is vertically adjustably secured in a member 91 which is slidable in a tubular member 92 secured to the carriage 83 and which is biased downwardly to the FIG. 11 position by the spring 93, the amount of spring bias being adjustable by turning the nut 94. The aforesaid adjustment of the bladder detector 81 enables depressing of the bladder B as hereinafter described to mold stacking height, whereby in a dual press having molds 15—12 of different stacking height, the respective bladder detectors 81 may be adjusted accordingly.

Referring now to FIGS. 1 to 9, FIG. 1 shows the closed position of the press 1 with a first tire T being cured in the closed mold, with a second uncured tire carcass T picked up from the platform 95 by the loader 80 and with a third uncured tire carcass T placed on the platform 95 ready for pickup at the end of the next cycle of the press 1.

After the carcass T has been subjected to a predetermined curing time in the closed mold, the drain cycle may be initiated by opening valve 76. At the beginning of the drain cycle, the chuck members 54 are extended as in FIG. 3. After the pressure in the bladder B has decreased to substantially 0 p.s.i., the chuck actuating cylinder 49 is moved downwardly to the FIG. 3 position to cause the chuck members 54 to move radially outward into engagement under the top bead before the tire T collapses. About 10 p.s.i. pressure is maintained on the post 68 throughout the cure cycle through the low-pressure valve 75 and deenergized solenoid valve 73.

Now, as the press opens as in FIG. 4, the post 68 is actuated with high-pressure air, i.e., about 70 p.s.i., through high-pressure valve 74 and energized solenoid valve 73 and vacuum is initiated at the same time within the bladder B by opening the cold water valve 78. This causes the upper end of the bladder B to follow the movement of the top mold section 15. At the same time, the bladder B is axially distended and the vacuum therein tends to draw the bladder B radially inwardly so that the cured tire T may be lifted as shown in FIG. 5 clear of the bladder B and moved rearwardly of the press 1 to a position wherein the tire T ejected from the top mold section 15 by actuation of ejector cylinder 42 is below the stripper 96. At that time, the chuck actuating member 49 may be moved upwardly to withdraw the chuck members 54 radially inwardly to clear the top bead of the tire T and then, as the ejector cylinder 42 is actuated upwardly to draw the toe ring 47 upwardly, the tire movement is arrested by the stripper 96 to release the top bead from the top toe ring 47 whereupon the cured tire T will drop down onto the inclined unloader conveyor 97 from where it slides rearwardly away from the press 1. By holding the tire T with the chuck members 54 kinked beads are prevented since the tire T is uniformly lifted or stripped from the bottom mold section 12 and from the bladder B.

In FIG. 5 when the cured tire T clears the upper end of the bladder B by a distance sufficient to permit downward movement of the ejector 45, the toe ring 47 ejects the cured tire T from the top mold section 15 so that when the press head 23 moves rearwardly, the upper sidewall of the tire T will be disposed beneath the stripper 96.

When the press is open as in FIG. 5, the uncured carcass T held by the loader 80 is disposed centrally above the bottom mold section 12 so that as the loader carriage 83 is lowered along the guide 84 the carcass T will be telescoped over the bladder B as shown in FIG. 6 and the bladder detector 81 will engage the upper end of the bladder B and the pilot portion 82 will enter the socket 72 of the bladder B to maintain coaxial alignment of the bladder and carcass. When the uncured carcass T reaches the position shown in FIG. 6 the high air pressure (70 p.s.i.) acting on the post 68 switches to low air pressure (10 p.s.i.) and the vacuum in the bladder B is turned off to allow some unpleating action of the bladder B to hold the carcass T firmly in position.

As shown in FIG. 7, the loader 80 continues down to mold level and the bladder detector 81 depresses the upper end of the bladder B and the post 68 to automatically adjust the stacking height. When the loader 80 reaches mold level, a time relay (not shown) is energized and this allows the bladder detector spring 93 to release compression and to start preinflation of the bladder B by opening the preinflate valve 63. The preinflate pressure in the bladder B actuates the bladder detector switch 98.

The preinflate pressure acting against the spring 93 pressure is used to be sure that the bladder B is forced around the inside contour of the uncured carcass T, whereupon the preshape pressure is then cut off by closing valve 63 and automatically switches to a very low hold pressure of say, approximately 1 p.s.i. by opening the hold valve 64. As shown in FIG. 8, after a time interval the loader segments 86 are actuated radially inwardly and the loader 80 moves upwardly away from the bladder B and thence moves forwardly as the press head 23 moves forwardly to align the top mold section 15 with the bottom mold section 12 as shown in FIG. 9.

The press head 23 then moves down and the pilot portion 51 of the chuck actuator 49 engages in the socket 72 in the upper end of the bladder B and final shaping continues and when the press is closed as in FIG. 1, curing medium through valve 60 is admitted into the bladder B through the spray ring 57 whereby final shaping and curing commences. During curing, the loader 80 in collapsed condition may move downwardly to pick up the carcass T on the platform 95 and another uncured carcass T then may be placed on the platform 95.

We, therefore, particularly point out and distinctly claim as our invention:

1. In a tire curing press wherein an uncured tire carcass positioned around a radially expansible bladder is cured by introducing curing medium into said bladder while the carcass is confined between complemental top and bottom mold sections of which the former is vertically movable away from the latter and thence laterally for unloading the cured tire from said bladder and for clearing said bladder for overhead loading of a succeeding uncured tire carcass from a downwardly moving loader; and wherein said bladder has a closed upper end engageable within said top mold section, an open lower end secured to the inner periphery of said bottom mold section, and a radially expansible sidewall engageable with the inside wall of the carcass; the improvement which comprises a fluid pressure actuated post means extending upwardly through the open end of said bladder to engage the closed upper end thereof; and actuating means to actuate said post means with pressures of different magnitudes, a higher pressure being employed during unloading to axially distend and radially contract said bladder as the upper end thereof moves in contact within the upwardly moving top mold section than during loading as the upper end of the axially distended bladder is depressed by the loader.

2. The press of claim 1 wherein said actuating means comprises valve means operative selectively to conduct such higher or lower pressure to said post means.

3. The press of claim 1 wherein said actuating means comprises a solenoid operated valve means operative selectively to conduct such higher or lower pressure to said post means upon energization or deenergization of said valve means.

4. The press of claim 1 wherein means are provided to drain curing medium from said bladder and to apply negative pressure within said bladder as said bladder is axially distended by such higher pressure actuation of said post means thus to facilitate radial contraction of said bladder.

5. The press of claim 4 wherein said means comprises a drain valve and an ejector.

6. The press of claim 1 wherein said loader, upon depression of said bladder to mold level, actuates preinflation means to radially expand said bladder into contact within said bladder to expel air from between said bladder and the inside wall of the uncured tire carcass.

7. The press of claim 6 wherein means are provided to decrease the pressure within said bladder to a low holding pressure following preinflation, whereupon said loader is withdrawn upwardly preparatory to movement of said top mold section downwardly to engage the top bead of the uncured tire carcass and the upper end of said bladder.

8. The press of claim 1 wherein said top mold section has chuck means and ejector means operative respectively to releasably engage a cured tire to lift and laterally shift it during the upward and lateral movements of said top mold section, and to eject the cured tire downwardly out of said top mold section; and wherein said press has a stationary stripper means disposed between said top mold section and the ejected cured tire whereby, upon release of said chuck means therefrom and upon upward movement of said ejector means to engage the tire with said stripper means, the cured tire is stripped from said ejector means for dropping by gravity laterally of said bottom mold section and said bladder.

* * * * *